US008832133B2

(12) United States Patent
Paparizos et al.

(10) Patent No.: US 8,832,133 B2
(45) Date of Patent: Sep. 9, 2014

(54) ANSWERING WEB QUERIES USING STRUCTURED DATA SOURCES

(75) Inventors: Stelios Paparizos, San Jose, CA (US); Alexandros Ntoulas, Mountain View, CA (US); John C. Shafer, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 12/545,872

(22) Filed: Aug. 24, 2009

(65) Prior Publication Data

US 2011/0047171 A1 Feb. 24, 2011

(51) Int. Cl.
*G06F 17/30* (2006.01)

(52) U.S. Cl.
USPC ........... 707/765; 707/791; 707/802; 707/828; 707/713; 707/736

(58) Field of Classification Search
USPC .................. 707/765, 791, 802, 828, 713, 736
See application file for complete search history.

(56) References Cited

U.S. PATENT DOCUMENTS

| | | | |
|---|---|---|---|
| 5,963,940 A * | 10/1999 | Liddy et al. ........................... | 1/1 |
| 6,094,649 A | 7/2000 | Bowen et al. | |
| 6,282,537 B1 | 8/2001 | Madnick et al. | |
| 6,457,002 B1 * | 9/2002 | Beattie et al. ................. | 707/765 |
| 6,633,885 B1 | 10/2003 | Agrawal et al. | |
| 6,675,159 B1 * | 1/2004 | Lin et al. ............................... | 1/1 |
| 6,732,090 B2 * | 5/2004 | Shanahan et al. ..................... | 1/1 |
| 6,778,979 B2 * | 8/2004 | Grefenstette et al. ................. | 1/1 |
| 6,782,505 B1 * | 8/2004 | Miranker et al. ............. | 715/203 |
| 6,820,075 B2 * | 11/2004 | Shanahan et al. ............. | 715/205 |
| 2007/0168331 A1 | 7/2007 | Reddy et al. | |

OTHER PUBLICATIONS

Chen, et al., "Keyword Search on Structured and Semi-Structured Data", retrieved at <<http://www.cse.unsw.edu/~weiw/files/SIGMOD09-KeywordSearch-Final.pdf>>, ACM, Jun. 29-Jul. 2, 2009, pp. 5.

"Structured Data is the New Search Engine Optimization", retrieved at <<http://buytaert.net/structured-data-is-the-new-search-engine-optimization>>, May 20, 2009, pp. 5.

Agrawal, et al., "Exploiting Web Search Engines to Search Structured Databases", retrieved at <<http://www2009.eprints.org/51/1/p501.pdf>>, ACM, Apr. 20-24, 2009, pp. 501-510.

(Continued)

*Primary Examiner* — Sana Al Hashemi
(74) *Attorney, Agent, or Firm* — Micah Goldsmith; Doug Barker; Micky Minhas

(57) ABSTRACT

Described is answering online web queries from a structured data store, such as a products database. An online web search query is modified into an evaluation expression for accessing a structured data store (e.g., a database, XML file, a flat table) to find search results. A query is matched to a pattern, which is used to generate the expression, as well as determine to which structured data store the query is routed. Tokens (e.g., words) in the query are processed against a dictionary of token classes (sets of tokens) and patterns (sets of token classes) to annotate the query to map the query to the matching pattern. A translation process generates the expression based on translation hints that correspond to the matching pattern. Also described is offline mining of query logs to generate the dictionaries.

20 Claims, 8 Drawing Sheets

(56) References Cited

OTHER PUBLICATIONS

Cafarella, et al., "Uncovering the Relational Web", retrieved at <<http://www.mit.edu/~y_z/papers/relweb-webdb08.pdf>>, Proceedings of the 11th International Workshop on Web and Databases, Jun. 13, 2008, pp. 6.

"Search Monkey: Site Owner Overview", retrieved at <<http://developer.yahoo.com/searchmonkey/siteowner.html>>, May 20, 2009, pp. 2.

"What Is Google Squared? It Is How Google Will Crush Wolfram Alpha (Exclusive Video)", retrieved at <<http://www.techcrunch.com/2009/05/12/what-is-google-squared-it-is-how-google-will-crush-wolfram-alpha-exclusive-video/>>, May 20, 2009, pp. 25.

Abadi, et al., "Scalable Semantic Web Data Management Using Vertical Partitioning", retrieved at <<http://cs-www.cs.yale.edu/homes/dna/abadirdf.pdf>>, Sep. 23-28, 2007, pp. 12.

Bhalotia, et al., "Keyword Searching and Browsing in Databases Using Banks", retrieved at <<http://www.cse.iitb.ac.in/~sudarsha/Pubs-dir/BanksICDE2002.pdf>>, pp. 10.

Botev, et al., "A Texquery-Based Xml Full-Text Search Engine", retrieved at <<http://www.cs.cornell.edu/~cbotev/sigmod2004quark.pdf>>, ACM, Jun. 2004, pp. 2.

Cheng, et al., "Entityrank: Searching Entities Directly and Holistically", retrieved at <<http://libra.msra.cn/paperDetail.aspx?id=4211511&>>, 2007, pp. 3.

Chu, et al., "A Relational Approach to Incrementally Extracting and Querying Structure in Unstructured Data", retrieved at <<http://pages.cs.wisc.edu/~ericc/VLDB2007.pdf>>, ACM, Sep. 23-28, 2007, pp. 12.

Hristidis, et al., "Efficient IR-Style Keyword Search over Relational Databases", retrieved at <<http://users.cs.fiu.edu/~vagelis/publications/IRKeyword.pdf>>, Proceedings of the 29th VLDB Conference, Berlin, Germany, 2003, pp. 12.

Li, et al., "Nalix: An Interactive Natural Language Interface for Querying XML", retrieved at <<http://www.eecs.umich.edu/db/files/130NaLIX.pdf>>, ACM, Jun. 14-16, 2005, pp. 3.

"MSN Shopping", retrieved at <<http://shopping.msn.com/xml/v1/getresults.aspx?text=camera>>, May 20, 2009, pp. 16.

Yang, et al., "Mining Web Logs for Actionable Knowledge", Retrieved at <<http://research.microsoft.com/en-us/um/people/jfgao/paper/yanglinggao.pdf>>, Intelligent Technologies for Information Analysis, Springer, 2004, 27 pages.

Agrawal, et al., "DBXplorer: A System for Keyword-Based Search Over Relational Databases", Retrieved at <<http://citeseerx.ist.psu.edu/viewdoc/summary?doi=10.1.1.114.5479>>, 2002, 12 pages.

Androutsopoulos, et al., "Natural Language Interfaces to Databases—An Introduction", Retrieved at <<http://citeseerx.ist.psu.edu/viewdoc/download;jsessionid=19DD55B74E73162AC86A034B57DEO5B1?doi=10.1.1.47.3954&rep=rep1&type=pdf>>, 1995, 50 pages.

* cited by examiner

```xml
<tokenClass id="3" name="productCategory" sample="digital camera">
<token>digital camera</token>
<token>mp3 player</token>
<token>cell phone</token>
...
<token>projector</token>
</tokenClass>
```
} Table Columns

```xml
<tokenClass id="6" name="modifiersNumeric" sample="around">
<token>near</token>
<token>around</token>
<token>for</token>
</tokenClass >
```
} Domain Specific Modifiers

```xml
<tokenClass id="10" name="model" sample="350d">
   <regex>^[A-Za-z]*[\d]+[A-Za-z]*$</regex>
 </tokenClass >

<tokenClass id="7" name="price" sample="$425">
   <regex>^[$€£]?\d+[\d\.\,]*$</regex>
 </tokenClass >
```
} Regular Expressions

```xml
<!--digital camera-->
 <pattern clickFrequency="11">
   <tokenClass name="productCategory" />
 </pattern>

<!--best digital camera-->
 <pattern clickFrequency="1000">
   <tokenClass name="modifiersQuery" />
   <tokenClass name="productCategory" />
 </pattern>

<!--digital camera around price-->
 <pattern clickFrequency="104">
   <tokenClass name="productCategory" />
   <tokenClass name="modifiersNumeric" />
   <tokenClass name="price" />
 </pattern>
```
} Patterns Created from Token Classes

FIG. 5

ANSWERING WEB QUERIES USING STRUCTURED DATA SOURCES

BACKGROUND

In commercial web search today, users typically submit short queries, which are then matched against a large set of documents. Often, a simple keyword search against the documents does not suffice to provide desired results, as many words in the query have semantic meaning that dictates evaluation. Consider for example a query such as "popular digital camera around $425". Performing a plain keyword match over a set of documents will not produce matches for cameras priced at $420 or $430, and so forth, even though such matches are very likely what the user is seeking.

At the same time, more desirable search results for many users may be found within a more focused set of data rather than the large set of documents that is traditionally searched. For example, the above query may provide more desirable results for many users if data related to shopping is searched, rather than a large collection of many unrelated web pages.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an online web search query is modified into an expression for accessing a structured data store (e.g., a database) to find search results. In one implementation, the query is matched to a pattern, which then may be used to route the query to an appropriate data store, as well as to generate the expression. To this end, tokens (e.g., words) in the query are processed against a dictionary of token classes (sets of tokens) and patterns (sets of token classes) to map the query to a matching pattern.

In one implementation, the query is processed into the expression by an annotation mechanism/process that finds the matching pattern from among candidate patterns. A translation process generates the expression based on translation hints that correspond to the matching pattern.

In one aspect, the dictionaries are generated using an offline mining process of a query log and information about the structured data store. Online query processing efficiently accesses these dictionaries to access the appropriate data store for a given input query.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 5 is a representation showing how online input including patterns is used by the online system to process an example user query.

DETAILED DESCRIPTION

Figure 1:
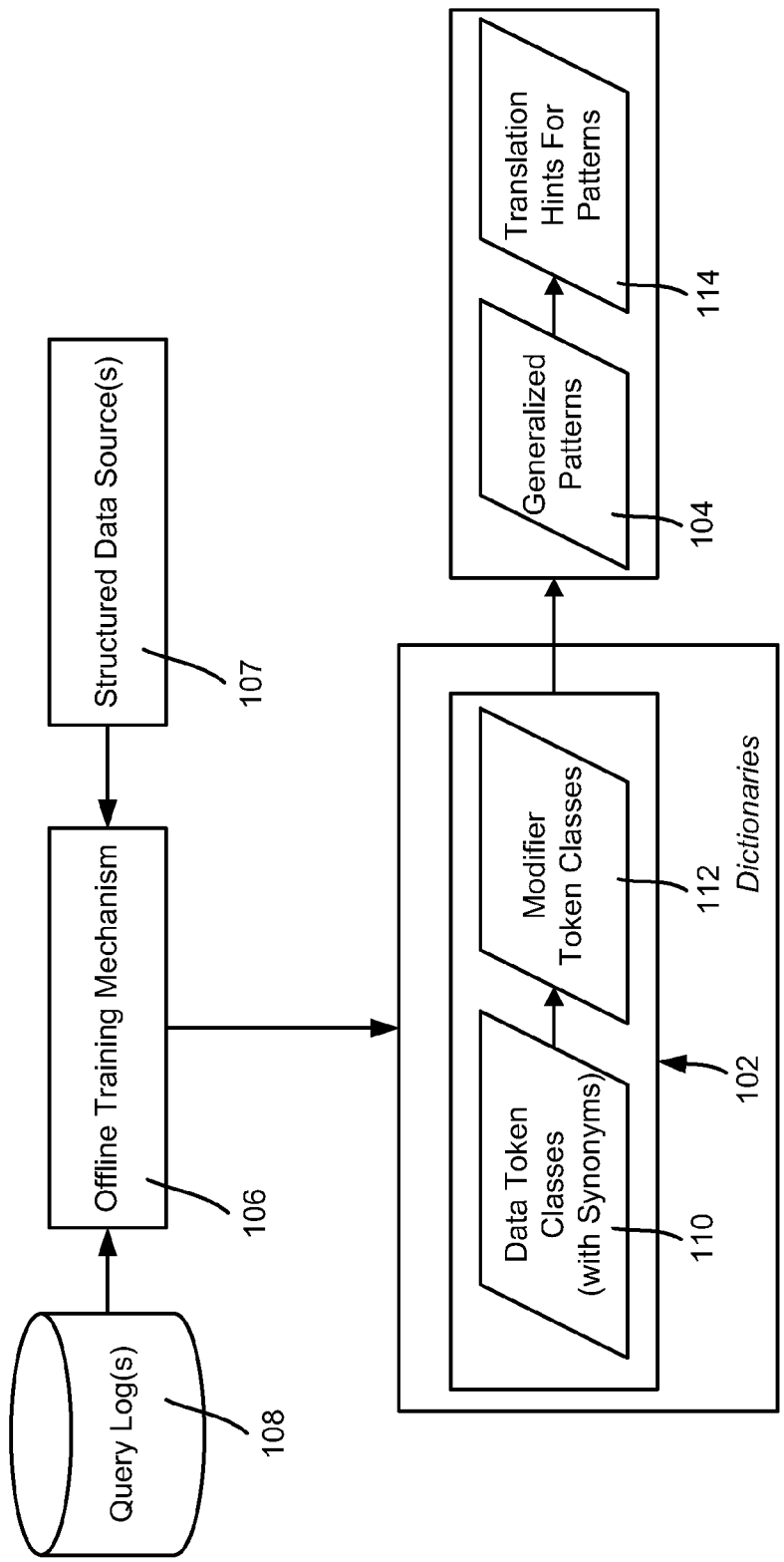
FIG. 1 is a block diagram representing example components for offline generation of dictionaries for use in answering web queries using structured data sources.

Various aspects of the technology described herein are generally directed towards using structured data to provide an answer to web queries. In general, this is provided via an end-to-end system that captures, annotates, translates and/or routes queries to structured (hidden) sources such as databases and returns relevant results to end web users using such information. To this end, there is described a system that incorporates responses from structured data for web queries by analyzing and translating them using secondary data structures, including query patterns (or simply patterns) as described below. Such patterns may be generated offline, manually and/or via query log mining, and may be continuously and/or regularly updated.

It should be understood that any of the examples herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and search/query processing in general.

Turning to some of the terminology used herein, certain primitives are referred to as token, token classes and patterns. A token is a sequence of characters, such as 'blue', 'Michael Jordan' and 'pc350'. Note that tokens can contain white space characters.

A token class is a set of tokens described by a deterministic function. For example, one token class may be <basketballplayers>={'Michael Jordan', 'Magic Johnson', 'Larry Bird'}, while another can be described by a regular expression, e.g., <model>='laptop'\d+, where 'laptop' is the matching string, \d a digit and + denotes the matching of at least one digit; (note that this notation is only one of many possibly ways to describe such a set of tokens). A token class may be maintained in a dictionary.

A pattern is a sequence of token classes. One pattern example is: pPlayerScored=<basketballplayers> <points>. As will be understood, patterns are optional, and/or there may be a simple universal pattern that accepts any token class to capture a generic dictionary-based lookup solution.

Token classes may be further classified into categories. A "Universal" category is one in which a generic mechanism describes them deterministically, e.g., number, date, time, location, which in general are the same across various databases or other data stores. A "DataDriven" category is generated from values of a specific attribute value or given database column, for example, in an implementation in which the structured data store is a database. An "Inconsequential" category contains token classes that do not affect query meaning; e.g., for the query 'what is the weather in Seattle', token class {'what', 'is', 'the'} is inconsequential for this context.

Another category is "Modifiers," which are token classes that alter how other token classes are processed. As an example of this category, consider the query 'popular digital camera around $300'; 'digital camera' maps to a <product> DataDriven token class, '$300' to a <price> Universal token class, while 'popular' and 'around' are Modifiers. In this example, 'popular' may be used to used to access data such as the number of reviews or other information (e.g., actual sales data obtained from the manufacturers) that filters the results to include only those with sufficient popularity, while 'around' may be used to convert the specified price value to a range of suitable price values, as described below. Such Modifiers are also described in U.S. patent application Ser. No. 12/473,286, hereby incorporated by reference.

Figure 2:
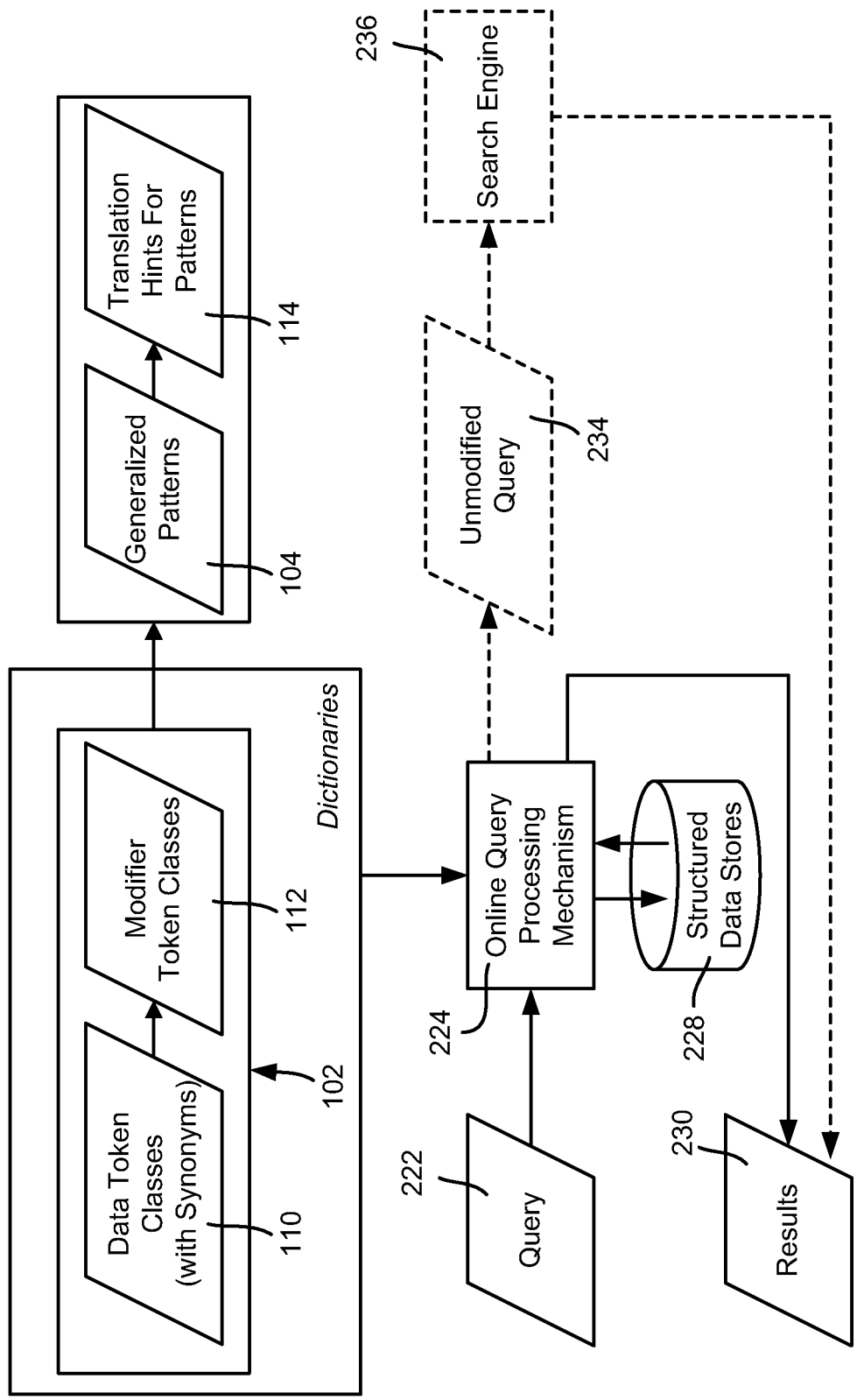
FIG. 2 is a block diagram representing example components for online processing of a web query by accessing the dictionaries to query structured data.

FIGS. 1 and 2 show a system that utilizes tokens, token classes 102 and patterns 104 to efficiently handle web queries over structured data. In one implementation, the system includes an offline component (FIG. 1) for building dictionaries as described below, and an online component (FIG. 2) that is responsible for query annotation and query handling, as also described below. As shown in FIG. 1, the offline component includes an offline training mechanism 106 that accesses a structured data source 107 and mines one or more query logs 108 to locate and process the token classes 102 (e.g., including the data token classes 110 and modifier token classes 112).

In online query processing (FIG. 2), the patterns 104, token classes 102 and tokens are available as input to an online query processing mechanism 224 that performs query annotation, routing and translation on the user queries as they were entered; each of these aspects are described below. For example, FIG. 2 shows the online processing of an input query 222 by the online query processing mechanism 224, which is processed by an online query processing mechanism 224. To this end, and as described below, the online query processing mechanism 224 accesses the token classes 102 to determine whether (and if so, how) to annotate the query 222 so as to be suitable for querying against a structured data store 228.

Note that such structured data stores may be any suitable source, such as fully relational databases, flat tables and/or XML files. Thus, as used herein, "table" is an abstract notion that generally represents a category of products or some logical set of items or the like with similar structure, which in practice may be backed by a real SQL database, XML data or flat files, and/or any data source with a table-like structure. As also used herein, "columns" are generally used to represent specific attributes of those items. Note that there may be multiple tables with possibly different structures, with each table representing different types of items, e.g. cameras, LCD televisions, shoes, movies and so forth.

Thus, one or more words in the query 222 may map the query to a particular table, category of products or other logical set of items, and other words map the query to that table's underlying data columns or attributes, that is, some subset of the table. If so, results 230 may be returned from that table and its columns.

Further, as shown for completeness in FIG. 1 by the dashed boxes and lines, other results 230 may be obtained by sending the query 234 to a search engine 236, e.g., as an unmodified conventional query. Note that it is feasible to merge results from a structured data store and a search engine.

In this way, information from structured data sources may be included into web results. Moreover, the system may use information in such structured data sources to automatically extract corresponding semantics from the query, and use them appropriately in improving the overall relevance of results.

Figure 3:
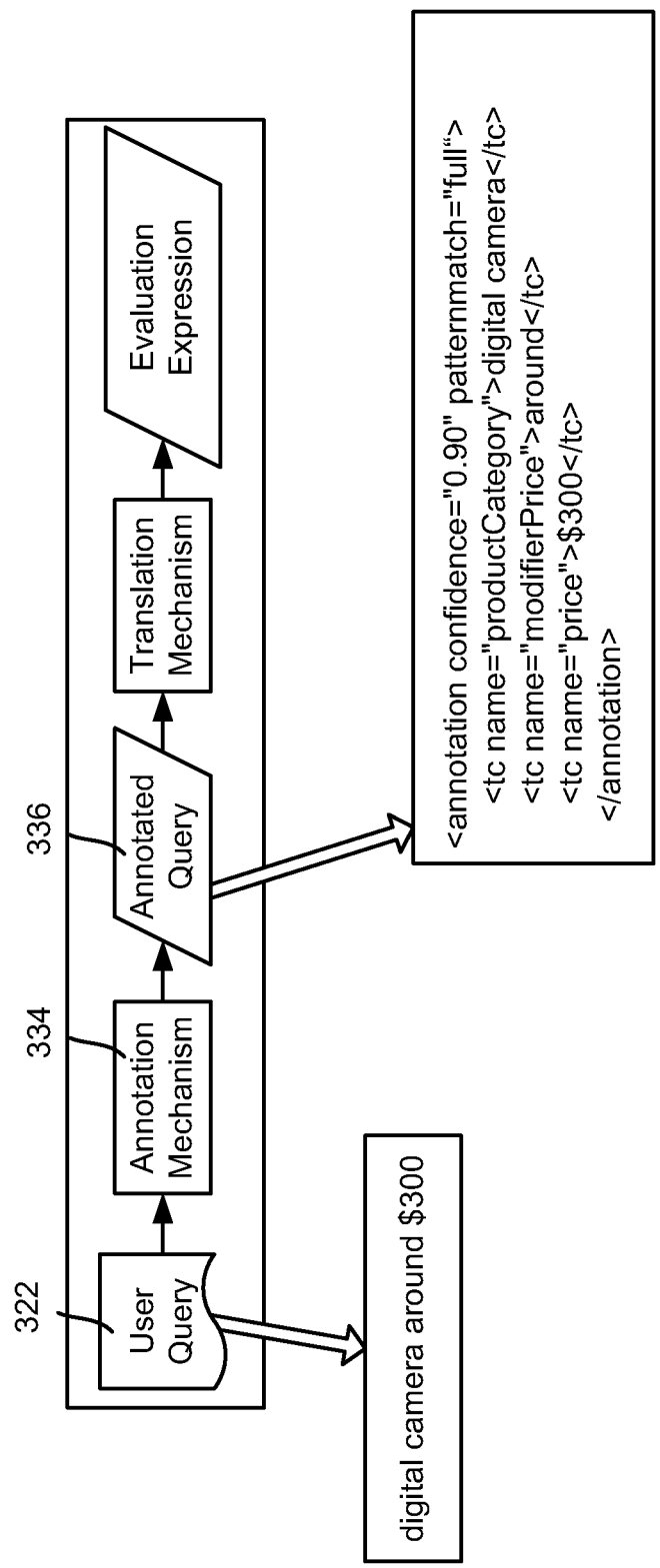
FIG. 3 is a block diagram representing how an annotation mechanism modifies a user query.

Part of processing the query includes query annotation (performed both in offline processing of a query log and online processing of an input query), and is generally represented in FIG. 3. As can be seen in the example of FIG. 3, the query 322 ("digital camera around $300") is processed by an annotation mechanism 334 such that "digital camera" is mapped to a token class named "productCategory", "around" is mapped to a modifier token class related to price named "modifierPrice" and $300 is mapped to a "price" token class. Note that "around" is a modifier to any numeric value, and is not limited to being a price-related modifier.

Segmentation (that is, pattern matching) is performed by the annotation mechanism 334 to break the query into meaningful pieces, annotating them with token classes. In one implementation, there are various candidate patterns, and for each candidate pattern, the annotation mechanism 334 maps tokens, e.g., using an LR(1) parsing process, namely single lookahead, matching maximum sub-pattern left to right. This process may be parallelized and the patterns kept in memory. Note that due to the numerous token classes, a single pattern may capture a large number of queries during query annotation. Advantages to using patterns include the compact representation, small memory footprint and fast query analysis that are obtained. For example, <brand><productClass> captures 'xyzcorp digital camera', 'abccorp digital camera', 'axbyczcorp HDTV', 'bcdco printer' and so forth (with actual brand names in practice, e.g., 'Microsoft software'.

Query annotation thus includes tokenizing each query and then performing segmentation using pattern matching. When tokenizing, a general goal is to associate query words with tokens in a meaningful way. In offline preparation, tokens may be combined into a large dictionary structure allowing fast lookups during online processing. In one implementation, a trie representation is used as the dictionary structure, with words matched to the maximum possible token size, going left to right in a single pass.

Routing is another aspect of online query processing, and forwards the user query to one or more data sources that can generate meaningful results. Note that because web search engines receive millions of queries daily, it is not computationally efficient to send all queries to all data sources and perform a keyword match. Thus, routing acts as a selective filtering step that enhances overall performance. In one implementation, the system maintains a corresponding database for each DataDriven token class, such as a commercial product token class, a recipe class, and so forth. After the pattern match, a single lookup is performed to route the query. In general, pattern matching facilitates efficient routing, as no additional steps are required.

Figure 4:
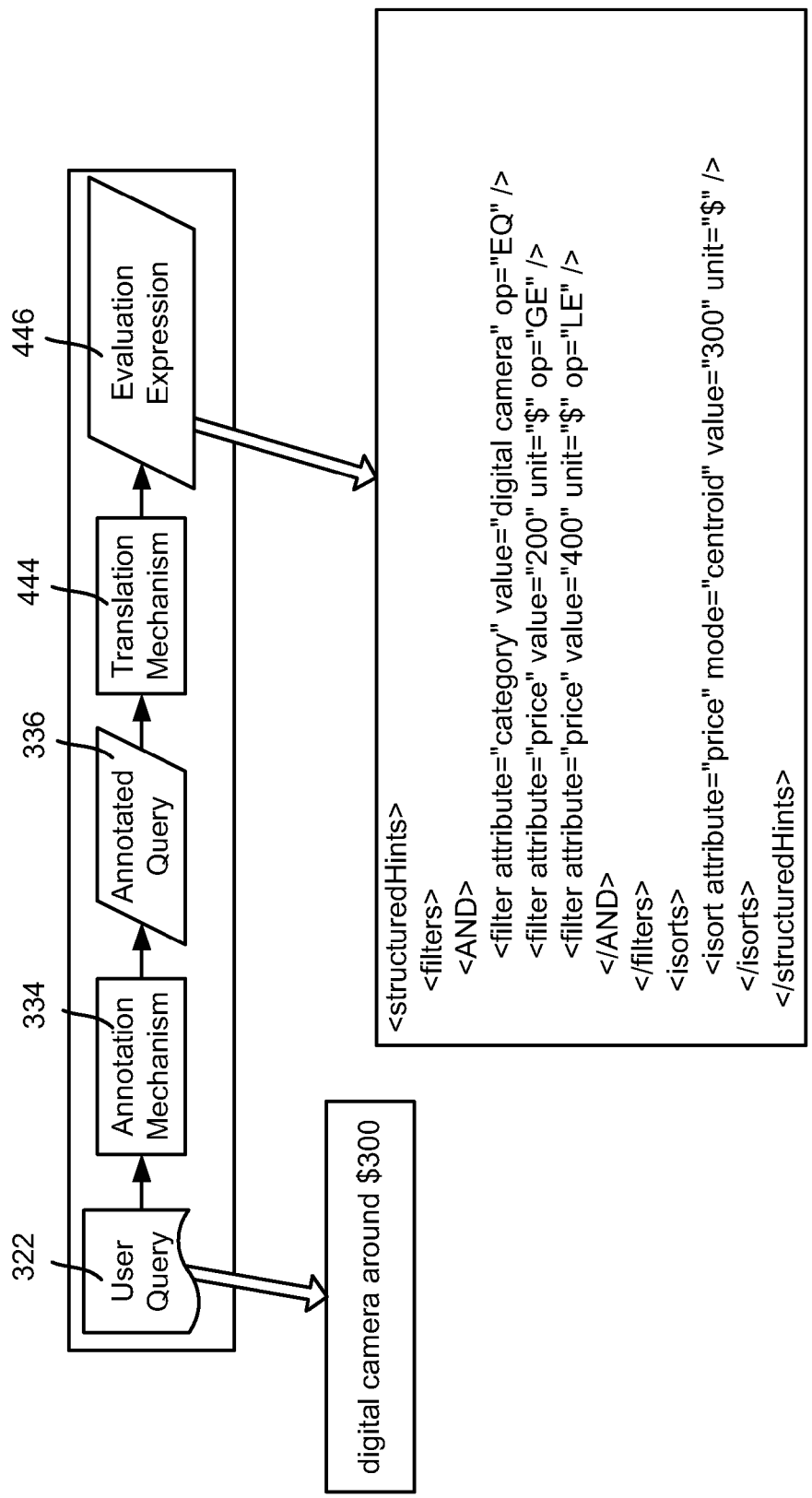
FIG. 4 is a block diagram representing how a translation mechanism modifies an annotated query into an evaluation expression.

Another aspect of the system is translation, exemplified in FIG. 4, which in general is performed by a translation mechanism 444 that converts the annotated query 336 to an evaluation expression 446, e.g., a Universal SQL-like expression. As can be seen in the example of FIG. 4, the price-related modifier "around" is translated so that only digital cameras ranging in price from greater than or equal to (GE) $200 to less than or equal to (LE) $400 will be returned in the search results. Also note that sorting is provided for in the translated evaluation expression 446.

Translation may be performed on the machine where the data is maintained. Note that one way to perform the translation is to implement SQL rules for each of the patterns used in the annotation. However, this is generally a cumbersome process, as a few token classes can result in a large number of patterns, e.g., a factorial of the number of token classes.

Thus, one implementation uses only a limited set of mappings having relatively few operations, including: i) Select (column) to access a column from a specific data store, such as price; ii) Filter(column, operand, value), to remove rows not satisfying the operand (GE or LE) and value condition on the column entries and iii) iSort(column) to indicate a sort intention on a column.

In general, "Select" obtains objects from the table into memory, and may be different from what is filtered. For example, the system may want to return the reviews of brand XYZ's cameras, whereby the system may select cameras, filter on the brand being XYZ and also select the reviews. In an alternative, the system may select cameras, filter brand=XYZ and project on the review. This includes a project operation, in which a "review" column is the only one returned, with the "brand" only accessed for filtering. In such an example, the select operation retrieves all cameras into memory, the filter operation removes the ones that do not satisfy the condition on brand=XYZ, and the project operation keeps only the column/attributes on review information to be returned to the user.

Given such operations, mappings are created to perform generic translation rules for the patterns, shown as the translation hints for patterns (block 114) in FIGS. 1 and 2. DataDriven token classes map to a Select on a corresponding column, as do Universal token classes. A mapping (e.g., operator entered) is used for mapping each Modifier token class to a corresponding Filter, iSort or Select operation. In this way, as another example, 'popular digital camera around $425' may be captured by a sequence of {Select(productClass), Filter(productClass, =, 'digital camera'), Filter(price, >, 375), Filter(price, <, 475), iSort(numOfReviews)}. At a high-level, note that only a relatively few set of mappings from token classes to operations are needed to capture a significantly large number of patterns, as most patterns have repeated combinations of the same token classes. Such mappings can be entered manually for a given domain, e.g., a shopping domain, and/or an automated process for determining mappings may be used.

FIG. 5 provides an example of how a set of token classes and patterns, which are provided as online input, are used by the online system to process a user query.

Figure 6:
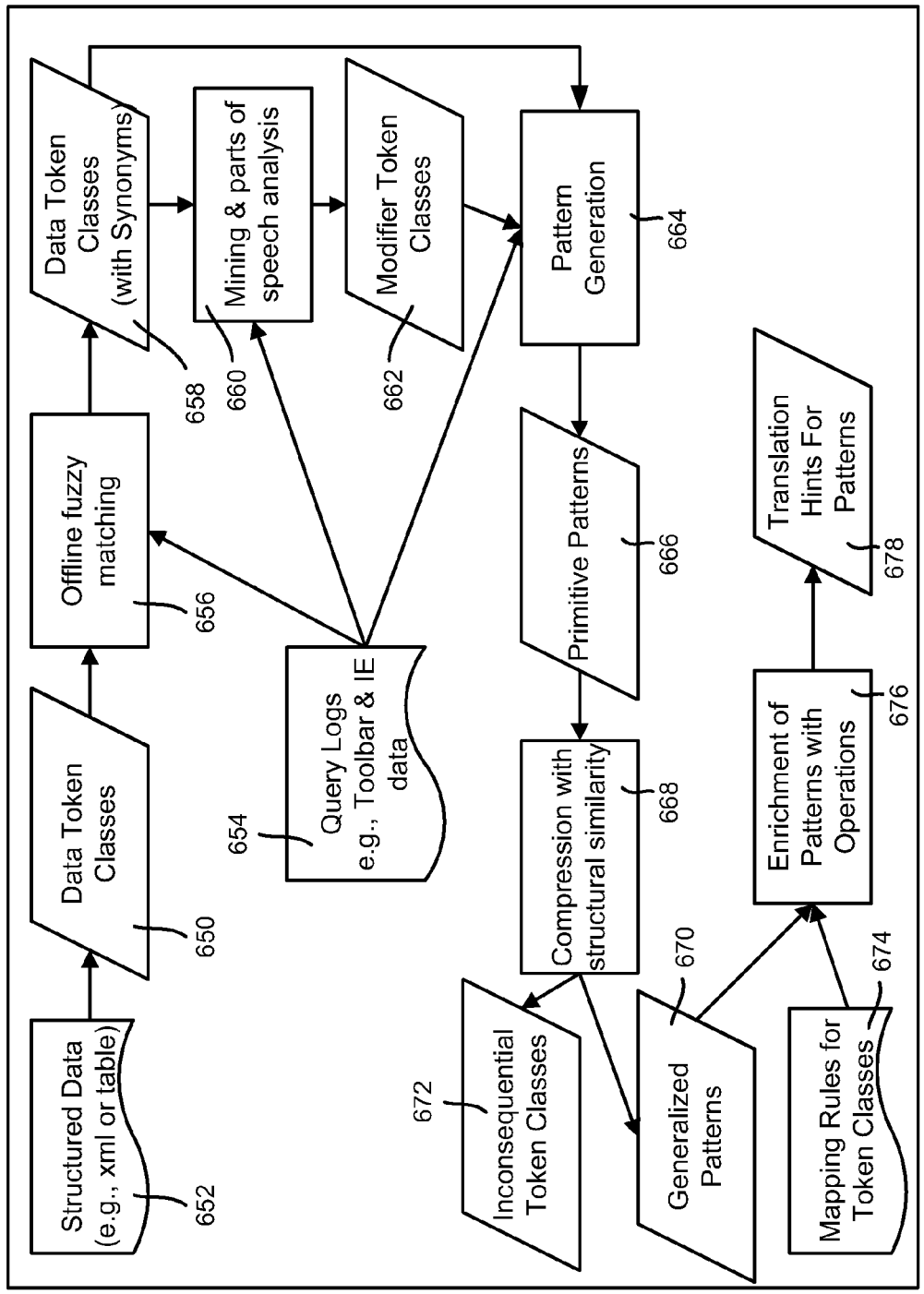
FIG. 6 is a representation of offline pattern mining and related processing to provide the dictionaries.

Turning to offline pattern mining as generally represented in FIG. 6, to obtain the patterns for a given domain, one implementation takes as input the DataDriven token classes and Universal token classes (block 650) obtained from the structured data 652 for that domain, and mines patterns by analyzing samples (e.g., on the order of millions) taken from query logs 654. For example, offline fuzzy matching 656 may provide token classes with synonyms 658, which are then analyzed (block 660) in conjunction with the mined query log(s) 654 to find the modifier token classes 662.

Figure 7:
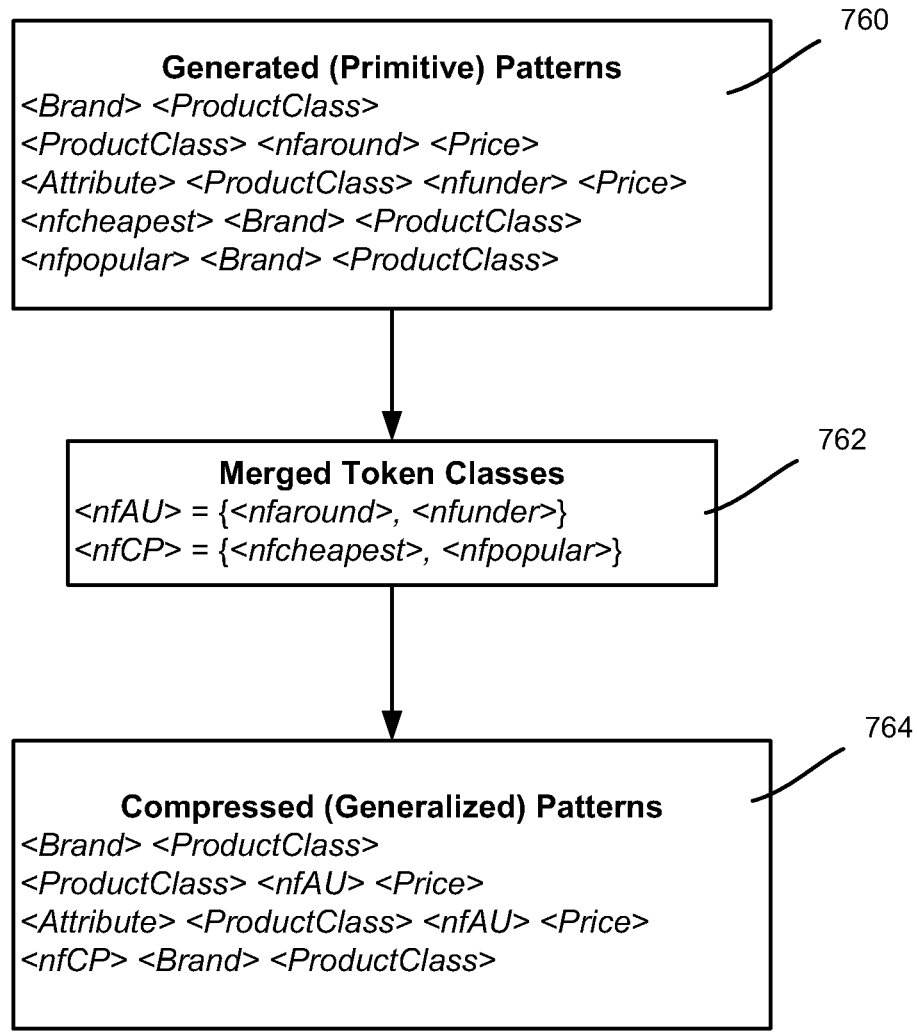
FIG. 7 is an example of pattern compression.

Patterns are then generated via a pattern generation mechanism 664 that creates primitive patterns 666 and compresses them (block 668) into generalized patterns 670, while also recognizing the inconsequential token classes 672. For example, in one implementation represented in FIG. 7, user queries plus token classes (e.g., brand names, product classes, attributes, price) are combined into patterns 760, with any unknown tokens placed into new token classes, such as "nfaround" or "nfunder" (where 'nf' represents new token class). The token classes may be merged (block 762), such as based upon structural similarity and frequency, and the patterns may be compressed via the merged token classes, e.g., as represented in block 764.

As described above, the mapping rules 674 may be used to enrich the patters with operations (block 676), thereby providing the translation hints 678. The following is an outline of one suitable pattern mining algorithm.

Input: A set of queries and DataDriven and Universal token classes
Output: A set of patterns
Procedure
1) Tokenize queries using input token classes.
2) Parse remaining unknown words in query.
   Create singleton token classes by clustering multiple words based on their inter-query co-occurrence frequency.
3) Create primitive patterns by rewriting each query using token classes.
4) Break each primitive pattern into elementary sub-patterns.
   Use input token classes and begin/end token classes as stop points.
5) Consider merging unknown tokens into single token class.
6) Use structural similarity amongst patterns to identify intra-query clusters.
7) Merge token classes according to frequency-based similarity; (e.g., Jaccard distance of candidate token classes).

The above algorithm follows a bottom-up approach based upon the process operating on the given structured data source 652. Based on the data, the DataDriven token classes 650 are identified by selecting all entries on a database column and removing duplicate values. Universal token classes are already available within the system as they are generic token classes applicable across domains (e.g., number, date, location). Using the DataDriven token classes and Universal token classes, the algorithm processes a number of queries, annotating the known tokens and creating new token classes for the unknown tokens, essentially converting everything into the primitive patterns 666. Subsequent steps may use structural and frequency-based similarity functions or the like to group patterns while merging token classes, e.g., by calculating the union of their tokens. The end result is a set of structurally varied patterns that contain the given token classes as well as newly-learned ones. The overall process can be generalized, allowing learning of patterns from a limited number of query samples, and subsequently using them to capture a significantly larger number of queries during the online processing.

Exemplary Operating Environment

Figure 8:
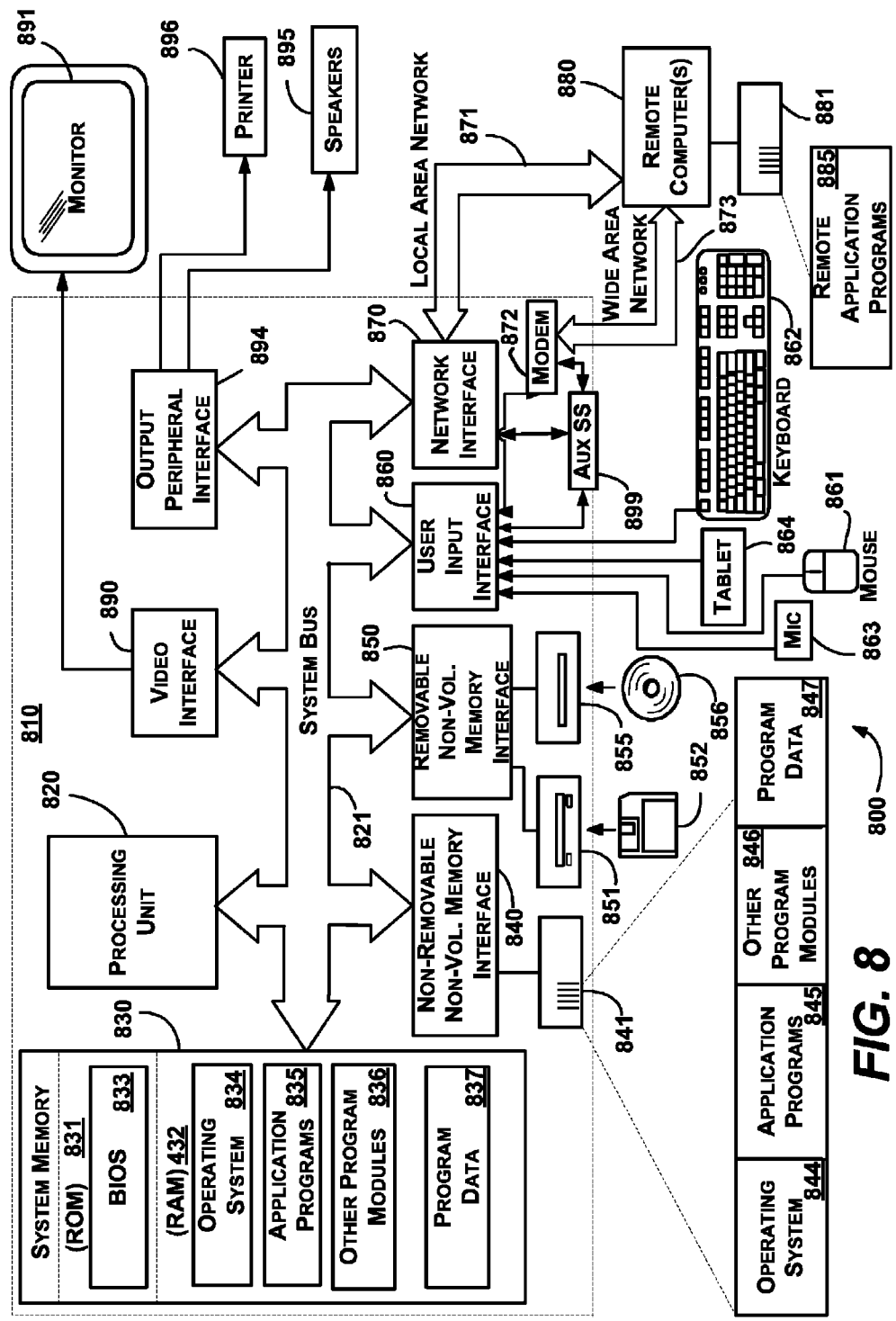
FIG. 8 shows an illustrative example of a computing environment into which various aspects of the present invention may be incorporated.

FIG. 8 illustrates an example of a suitable computing and networking environment 800 into which the examples and implementations of any of FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising, processing an online web search query, including generating one or more patterns based upon dictionary information obtained from query logs in which the dictionary information comprises data indicating universal token classes, data driven token classes and modifier token classes, finding a matching pattern that matches the online web search query from among the one or more patterns, translating the online web search query based on the matching pattern into the evaluation expression, using the expression to access data in a structured data store, and returning search results including results obtained from the structured data store.

2. In a computing environment, a system comprising, a structured data store, dictionary information comprising a set of dictionaries, and a query processing mechanism configured to generate one or more patterns based upon dictionary information obtained from query logs, receive an input web query, segment the input web query into parts corresponding to token classes from the dictionary information to find candidate patterns, find a matching pattern that matches the input web query amongst the candidate patterns, use the matching pattern to translate the input web query into an expression, and to query the structured data store with the expression to return search results for the input web query including data accessed from the structured data store.

3. At least one computer storage medium having computer-executable instructions stored thereon, which in response to execution by a computer, cause the computer to perform steps comprising: generating one or more patterns based upon dictionary information obtained from query logs, annotating the online web query into tokens and token classes from the dictionary information, segmenting the online web query into parts to find candidate patterns, finding a matching pattern that matches the online web query from among the candidate patterns, modifying the online web query into an evaluation expression based on the matching pattern, using the matching pattern to determine which structured data store to route the evaluation expression, using the evaluation expression to access data in the structured data store, and returning search results including the data accessed from the structured data store.

4. The method of claim 1 further comprising determining which structured data store of a plurality of structured data stores to use in accessing the data.

5. The method of claim 1 wherein modifying the query comprises annotating the query into one or more parts, and mapping at least one part to a subset of the set of structured data.

6. The method of claim 1 wherein the structured data store comprises a database table, wherein the subset of a set of structured data comprises a column of that table, and wherein using the expression to access the data comprises filtering data in the column.

7. The method of claim 1 wherein modifying the query comprises annotating the query into parts, including matching words of the query to tokens, annotating the query with token classes, finding candidate patterns, and mapping the tokens for each candidate pattern.

8. The method of claim 1 wherein using the expression to access data comprises matching a pattern to words in the online web search query.

9. The method of claim 1 further comprising, mining at least one of the query logs to obtain the dictionary information, or accessing structured data to obtain the dictionary information, or both mining at least one query log and accessing structured data to obtain the dictionary information.

10. The system of claim 2, wherein the query processing mechanism is further configured to annotate the input web query based upon a token class.

11. The system of claim 2 wherein the query processing mechanism is further configured to find a matching pattern and use the matching pattern to determine which structured data store, of a plurality of available structured data stores, to query with the expression.

12. The system of claim 2 wherein the structured data store comprises a database of information related to commercial products.

13. The system of claim 2 wherein the set of dictionaries comprises data indicating universal token classes, data driven token classes and modifier token classes, wherein one or more select operations, filter operations, sort operations, or project operations operate on data driven tokens classes, the universal token classes or the modifiers, or any combination of the data driven tokens classes, the universal token classes or the modifiers.

14. The system of claim 2 wherein the expression includes one or more operations, including a select operation to select a column, an access operation to access a column from the structured data store, a filter operation to filter a column based upon an operand and a value condition so as to remove rows not satisfying the operand and value condition on entries of the column, or a sort operation to sort rows, or any combination of one or more select operations, access operations, filter operations, or sort operations.

15. The at least one computer storage medium of claim 3 having further computer-executable instructions, which in response to execution by the computer, cause the computer to perform further steps comprising: translating the online web query, based on the matching pattern, into the evaluation expression, and accessing the data store with the evaluation expression to obtain the search results for the online web query.

16. The at least one computer storage medium of claim 3 having further computer-executable instructions, which in response to execution by the computer, cause the computer to perform further steps comprising: routing the evaluation expression to the structured data store based upon the matching pattern.

17. The method of claim 8 further comprising using the pattern to determine which structured data store of a plurality of structured data stores to use in accessing the data.

18. The method of claim 9 further comprising generating the one or more patterns based on the structured data source.

19. The method of claim 18 further comprising compressing the patterns based on frequency or structural similarity, or both frequency and structural similarity, of words in query log.

20. The method of claim 18 further comprising using mapping rules for the pattern to obtain translation-related information for modifying the online web search query into the expression.

\* \* \* \* \*